United States Patent
Weng

(10) Patent No.: US 8,824,066 B2
(45) Date of Patent: Sep. 2, 2014

(54) PLASTIC OPTICAL LENS AND AN INJECTION-MOLDING METHOD FOR MANUFACTURING THE SAME

(71) Applicant: Largan Precision Co., Ltd., Taichung (TW)

(72) Inventor: Wei-Hung Weng, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 21 days.

(21) Appl. No.: 13/661,281

(22) Filed: Oct. 26, 2012

(65) Prior Publication Data

US 2014/0009840 A1 Jan. 9, 2014

(30) Foreign Application Priority Data

Jul. 5, 2012 (TW) .............................. 101124176 A

(51) Int. Cl.
*G02B 3/08* (2006.01)
*G02B 3/00* (2006.01)
*B29D 11/00* (2006.01)

(52) U.S. Cl.
USPC .............................. 359/741; 359/642; 264/2.7

(58) Field of Classification Search
USPC ............ 359/642, 741, 796, 811, 819; 264/2.7
See application file for complete search history.

(56) References Cited

U.S. PATENT DOCUMENTS 6,008,957 A * 12/1999 Nomura et al. ................ 359/819
2009/0213476 A1 * 8/2009 Takumi et al. ................. 359/796

FOREIGN PATENT DOCUMENTS

JP       2006-316847       6/2008

* cited by examiner

*Primary Examiner* — William Choi
(74) *Attorney, Agent, or Firm* — Morris Manning & Martin LLP; Tim Tangkang Xia, Esq.

(57) ABSTRACT

This invention provides an injection-molded plastic optical lens comprising: an optical effective region and a peripheral region that are concentrically formed. An outer edge of the peripheral region comprises an indentation section, and an accommodation space surrounded by the indentation section of the outer edge of the peripheral region and an extending line extending from the non-indented section of the outer edge of the peripheral region. The accommodation space confines a flash generated during the injection-molding process of the plastic optical lens so that the assembling of the present plastic optical lens will not be affected. The present invention employs a mold having an air duct connected to an indentation configuration of the mold. The indentation section of the plastic optical lens is formed through a mold replication of the indentation configuration.

7 Claims, 7 Drawing Sheets

US 8,824,066 B2

PLASTIC OPTICAL LENS AND AN INJECTION-MOLDING METHOD FOR MANUFACTURING THE SAME

CROSS-REFERENCE TO RELATED APPLICATION

This non-provisional application claims priority under 35 U.S.C. §119(a) on Patent Application No. 101124176 filed in Taiwan (R.O.C.) on Jul. 5, 2012, the entire contents of which are hereby incorporated by reference.

BACKGROUND

1. Technical Field

The present invention relates to a plastic optical lens and an injection-molding method for manufacturing the same, and more particularly, to a plastic optical lens having a partially indented configuration and an injection-molding method for manufacturing the same.

2. Description of the Related Art

An injection-molded plastic optical lens is formed by injecting a molten plastic material into a mold cavity via a sprue gate after the pieces of the mold have been fully closed together. As the molten plastic material is injected into the mold cavity, the presence of the residual compressed air in the mold cavity at high temperature will scorch and damage the surface of the molded article. Even without damaging the surface of the molded article, the molten plastic material may fill the mold cavity incompletely due to the residual air and thereby adversely affecting the shape of the final molded article formed through a mold replication of the cavity. As there is an increasing demand for high precision lenses for portable mobile devices, it is important to improve the air duct performance during the molding process. In order to prevent the occurrence of the aforementioned problems, a parting plane of a mold is generally provided with an air duct in the form of a shallow groove to allow the air flow access with the external environment so as to facilitate the escape of air from the mold cavity. However, flashes may be formed easily at the exit of the air duct due to the flow of the molten plastic material. JP Patent No. 2008-126611A discloses an air exhaust means that involves incorporation of the air duct as an integral part of the molded article. FIGS. 1A and 1B illustrate a prior art plastic optical lens 1 disclosed in JP Patent No. 2008-126611A. The prior art plastic optical lens 1 comprises an optical effective region 1b and a peripheral region 1f that are concentrically formed, wherein the peripheral region 1f has a sprue gate 1g and a flash 15 protruding therefrom and arranged opposite to the sprue gate 1g. As the flash 15 protruding from the peripheral region 1f will adversely affect the assembling of the prior art plastic optical lens 1, mechanical processing is required to remove the flash 15. Accordingly, the processing cost is increased.

SUMMARY

The present invention provides an injection-molded plastic optical lens comprising: an optical effective region and a peripheral region that are concentrically formed, wherein an outer edge of the peripheral region comprises an indentation section at which a flash generated during the injection-molding process of the plastic optical lens is formed within the extending line extending from the non-indented section of the outer edge of the peripheral region so that the flash will not adversely affect the subsequent assembling of the plastic optical lens.

The present invention further provides an injection-molding method for manufacturing the aforementioned plastic optical lens. This method employs a mold having an air duct connected to an indentation configuration of the mold. The indentation section of the aforementioned plastic optical lens is formed through a mold replication of the indentation configuration.

DETAILED DESCRIPTION OF THE PREFERRED EMBODIMENTS

The plastic optical lens of the present invention and the injection-molding method for manufacturing the same will be described by way of two embodiments and the accompanying drawings. It is to be noted that the flash 23 illustrated in the appended drawings is merely used to delineate the potential range of the flash growth while its shape and size are not limited thereto. The flash 23 may have an irregular shape in practice.

Figure 1A:
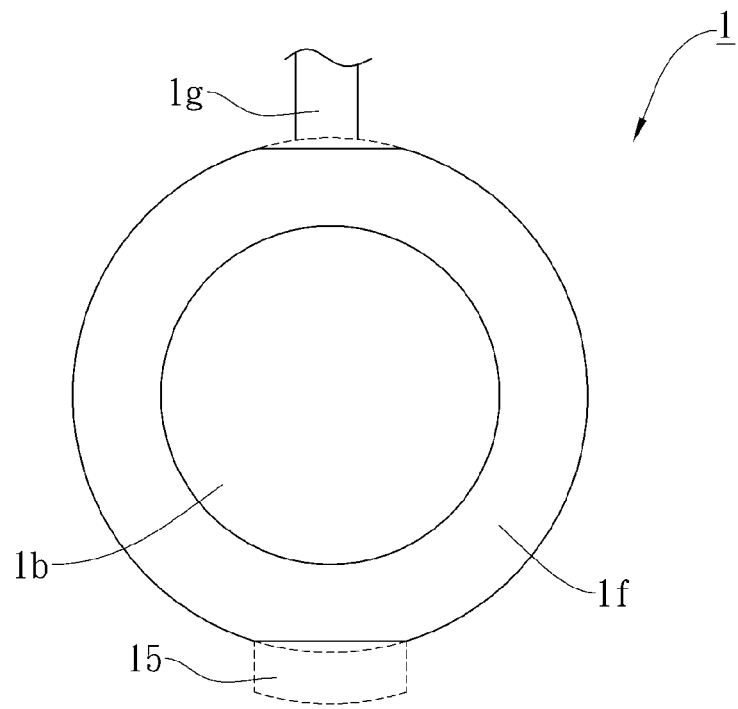
FIG. 1A is a top view of a prior art plastic optical lens.
Figure 1B:
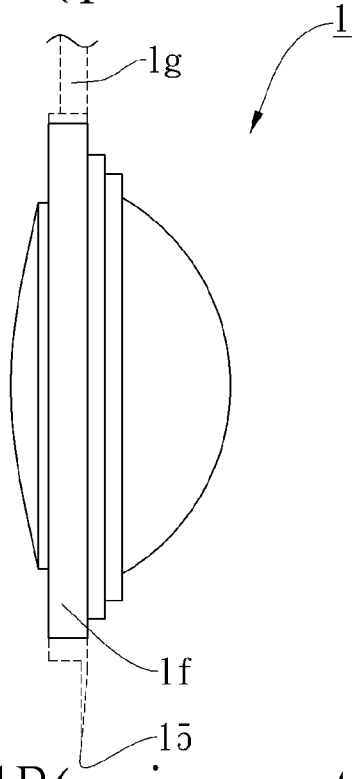
FIG. 1B is a side view of a prior art plastic optical lens.
Figure 2A:
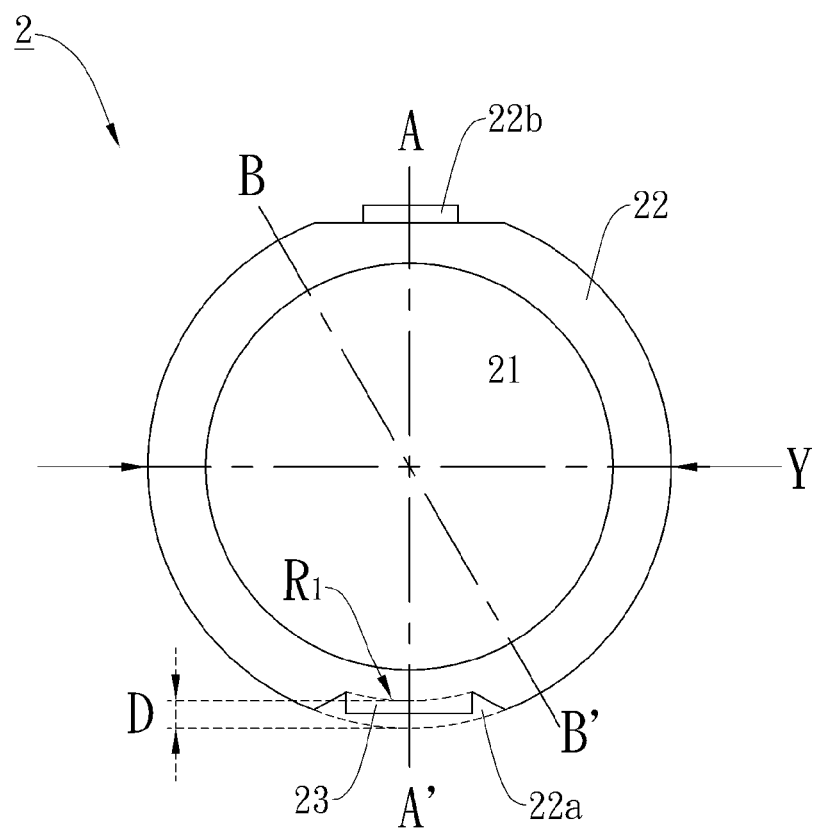
FIG. 2A is a top view of a plastic optical lens in accordance with the first embodiment of the present invention.
Figure 2B:
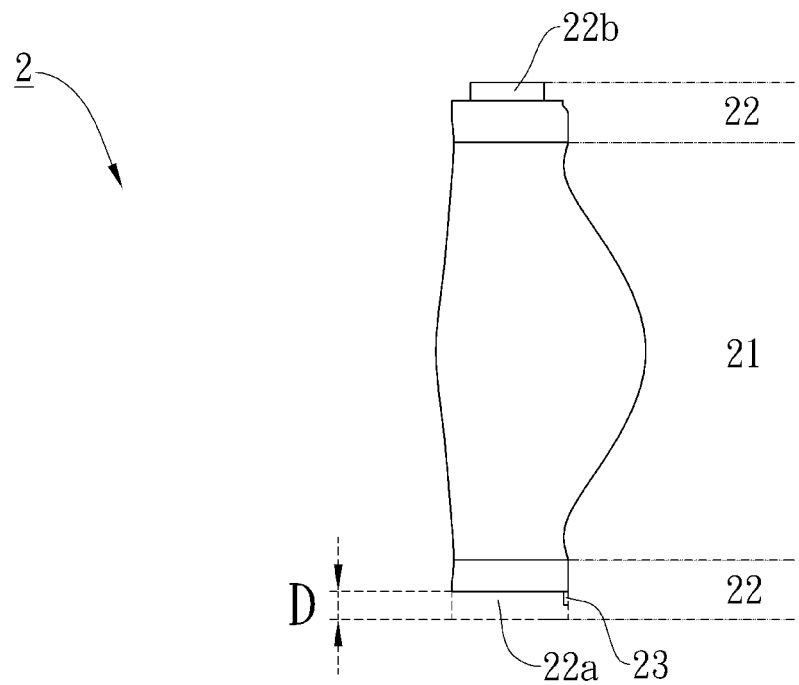
FIG. 2B is a sectional view of the plastic optical lens taken along the line A-A' in FIG. 2A in accordance with the first embodiment of the present invention.
Figure 2C:
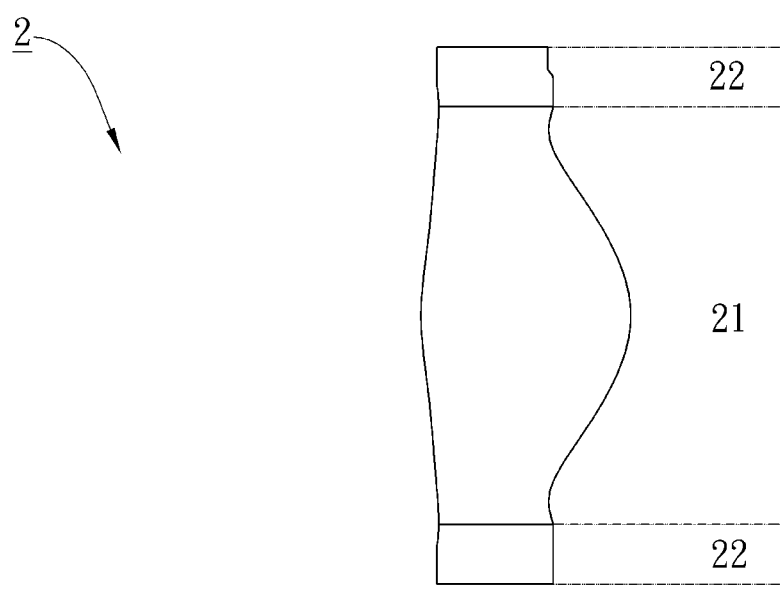
FIG. 2C is a sectional view of the plastic optical lens taken along the line B-B' in FIG. 2A in accordance with the first embodiment of the present invention.

FIGS. 2A, 2B, and 2C are a top view of a plastic optical lens 2 and two sectional views taken respectively along lines A-A' and B-B' in FIG. 2A in accordance with the first embodiment of the present invention. In the first embodiment, the plastic optical lens 2 comprises an optical effective region 21 and a peripheral region 22. An outer edge of the peripheral region 22 of the plastic optical lens 2 comprises an indentation section, and an accommodation space 22a surrounded by the indentation section of the outer edge of the peripheral region 22 and an extending line extending from the non-indented section of the outer edge of the peripheral region 22. In addition, a sprue gate 22b is provided at the outer edge of the peripheral region 22 and arranged opposite to the indentation section. According to an injection-molding method of the present invention, the flash 23 generated during the injection-molding process of the plastic optical lens 2 is formed within the accommodation space 22a so that the flash will not adversely affect the subsequent assembling of the plastic optical lens 2. The plastic optical lens 2 has an outer diameter Y of 3.54 cm; the indentation section includes an arc R1 which is concentric with the plastic optical lens 2; the accommodation space 22a with a central width D of 0.08 cm surrounded by the arc R1 having a radius of curvature of 1.7 cm and an extending line extending from the non-indented section of the outer edge of the peripheral region 22. The central width D is defined as the distance from the indentation section of the outer edge of the peripheral region 22 to the extending line extending from the non-indented outer edge of the peripheral region 22 measured along the line A-A'. FIGS. 2B and 2C are sectional views of the plastic optical lens 2 taken respectively along lines A-A' and B-B' in FIG. 2A. As shown in the drawings, the accommodation space 22a and the sprue gate 22b are visible only in FIG. 2B.

Figure 3A:
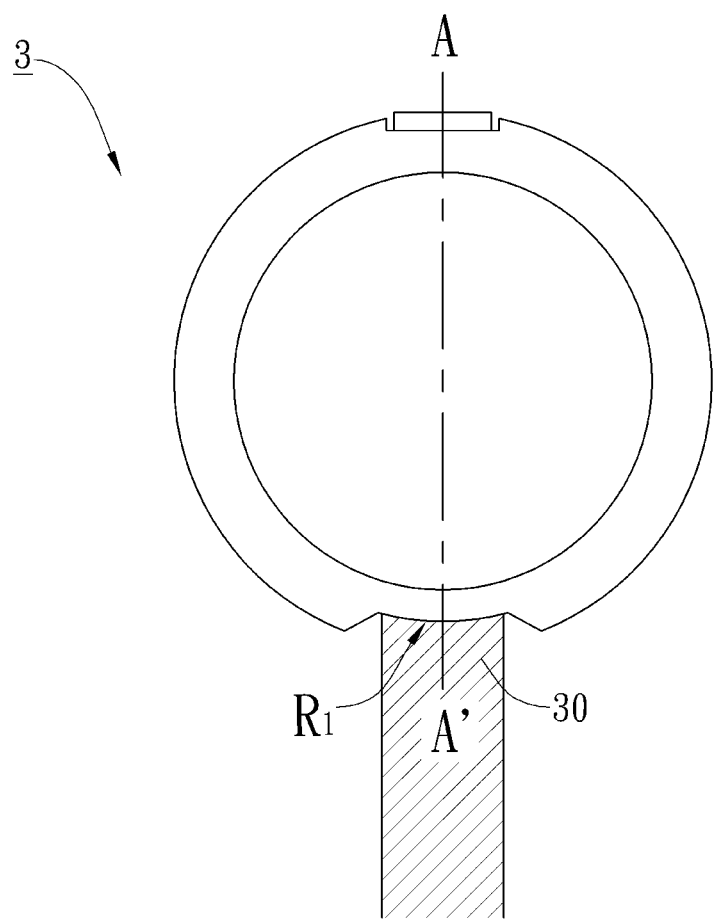
FIG. 3A is a top view of a mold for injection molding the plastic optical lens of the first embodiment.
Figure 3B:
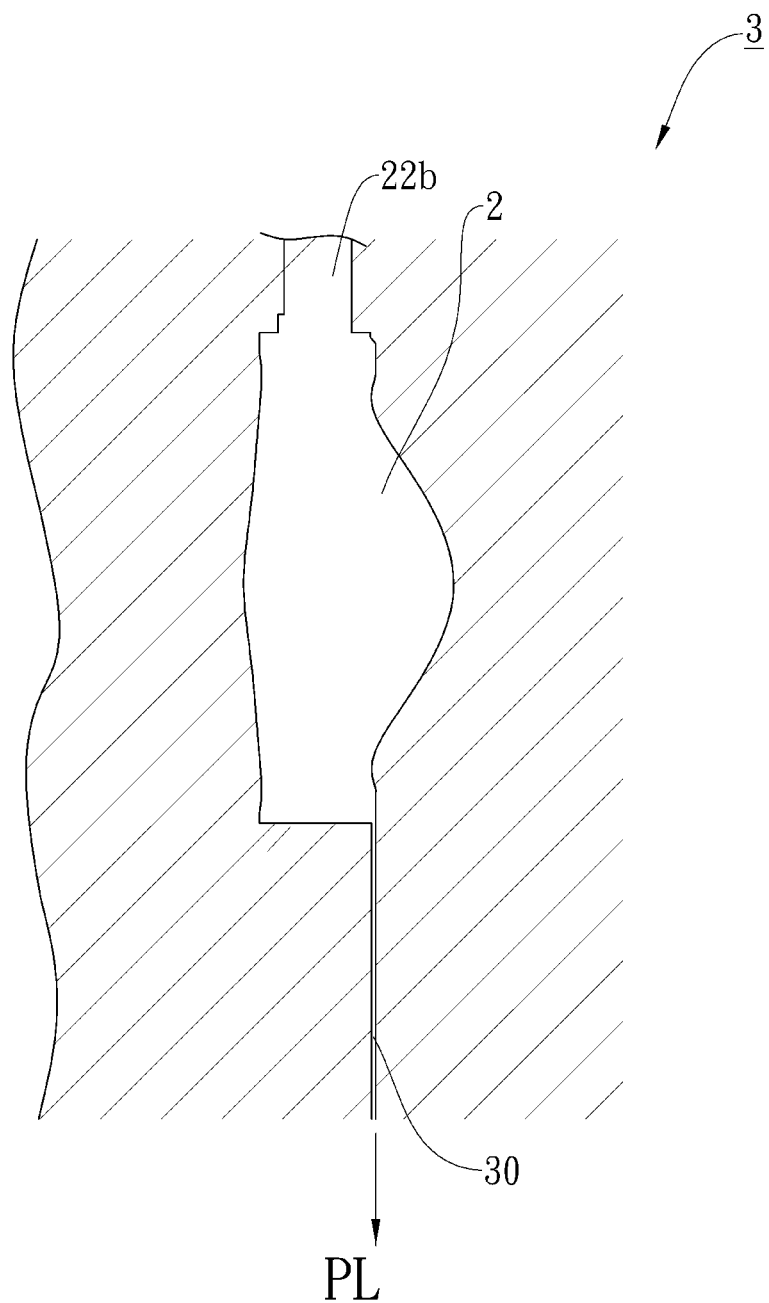
FIG. 3B is a sectional view of the mold for injection molding the plastic optical lens of the first embodiment taken along the line A-A' in FIG. 3A.

In the first embodiment of the present invention, the plastic optical lens 2 is injection molded by using a mold 3 having an air duct 30. FIGS. 3A and 3B are a top view of the mold 3 and a sectional view of the mold 3 taken along the line A-A' in FIG. 3A, respectively. The air duct 30 is configured to channel the air out of the cavity of the mold 3 so that the shape of the molded article can be replicated by the mold 3 more precisely. As shown in FIG. 3B, it is preferable that the air duct 30 is disposed at the parting plane PL of the mold 3. Due to the flow of the molten plastic material injected into the cavity of the mold 3 during the injection-molding process, a flash 23 is formed at the location where the outer edge of the plastic optical lens 2 is connected to the air duct 30. The portion of the outer edge of the mold 3 where the mold 3 is connected to the air duct 30 has an indentation configuration. The indentation section of the plastic optical lens 2 is formed through a mold replication of the indentation configuration, and the flash 23 is accommodated within the accommodation space 22a formed through a mold replication of the indentation configuration. In addition, the mold 3 has a sprue gate arranged opposite to the indentation configuration. Therefore, the flash 23 of the plastic optical lens 2 shown in FIG. 3 will not adversely affect the subsequent assembling of the plastic optical lens 2, as shown in FIG. 2, and no additional processing procedure is required to remove the flash 23. This feature can reduce costs incurred by additional processing procedures and longer manufacturing time.

Figure 4:
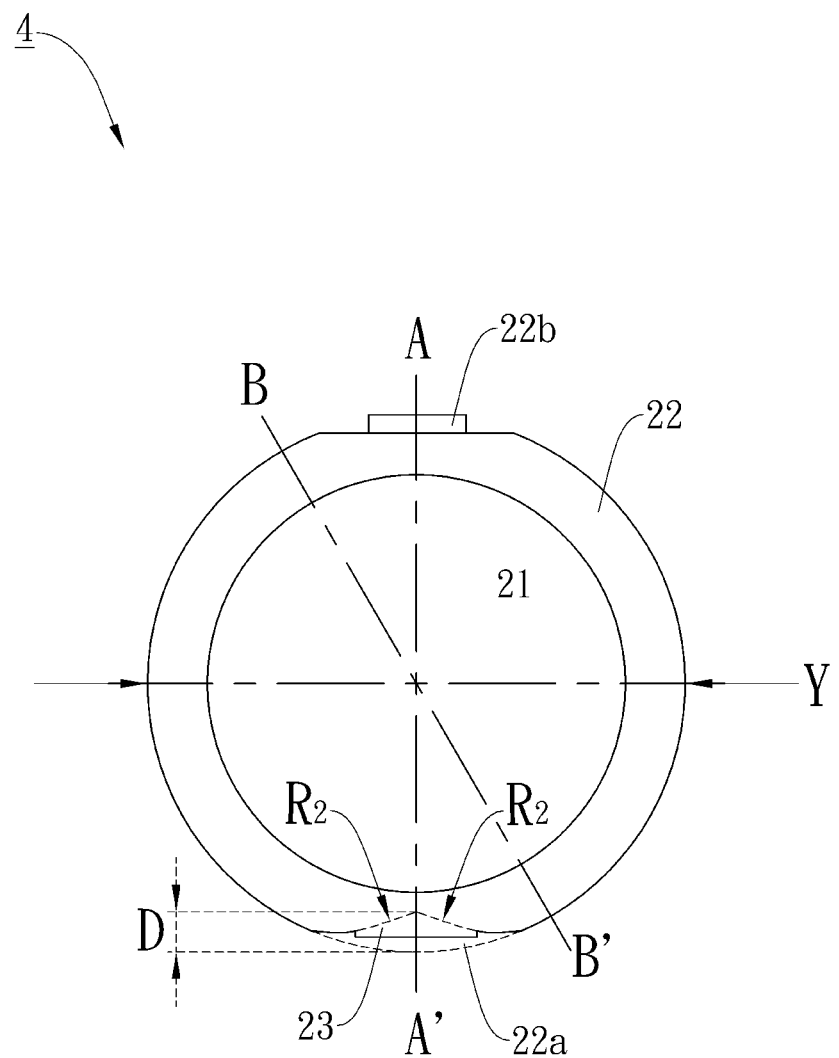
FIG. 4 is a top view of a plastic optical lens in accordance with the second embodiment of the present invention.

FIG. 4 shows a plastic optical lens 4 in accordance with the second embodiment of the present invention. The plastic optical lens 4 of this embodiment and the plastic optical lens 2 of the first embodiment are substantially similar, thus description of the same components will be omitted. The plastic optical lens 4 is different from the plastic optical lens 2 mainly in the shape of the indentation section thereof. The outer edge of the plastic optical lens 4 has an inverted V-shaped indentation section formed by the intersection of two arcs R2 having a radius of curvature of 1.0 cm, and the accommodation space 22a with a center width D of 0.12 cm surrounded by the inverted V-shaped indentation section and an extending line extending from the non-indented section of the outer edge of the peripheral region.

Figure 5:
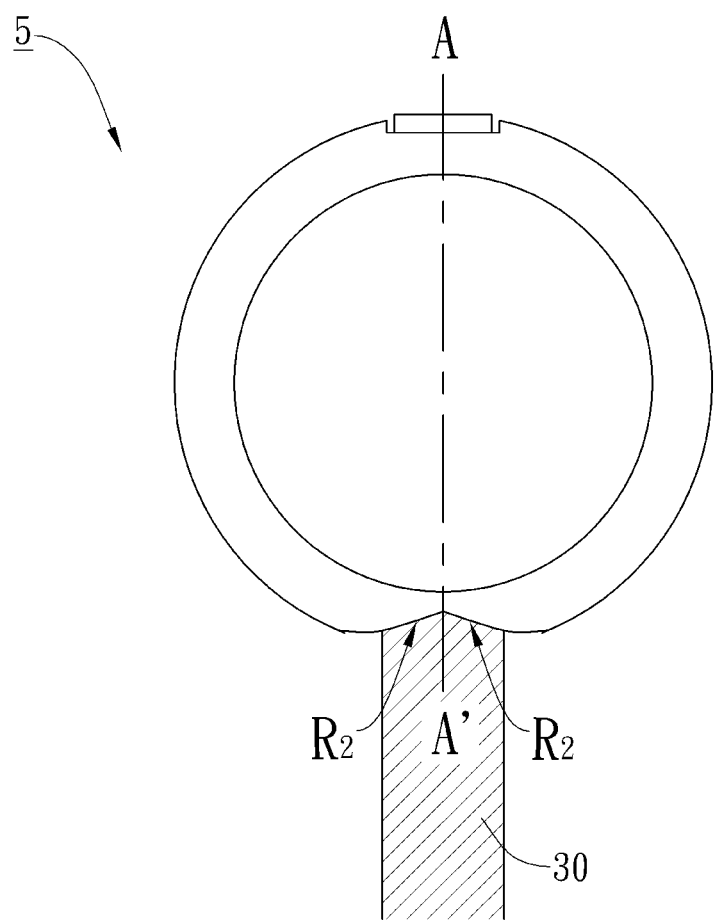
FIG. 5 is a top view of a mold for injection molding the plastic optical lens of the second embodiment of the present invention.

In the second embodiment of the present invention, the plastic optical lens 4 is injection molded by using a mold 5 having an air duct 30. Referring to FIG. 5, the mold 5 and the aforementioned mold 3 are different only in the indentation configuration. The mold 5 has an inverted V-shaped indentation configuration connected to the air duct 30 of the mold 5. The indentation section of the plastic optical lens 4 is formed through a mold replication of the indentation configuration, and the flash 23 is accommodated within the accommodation space 22a formed through a mold replication of the indentation configuration. Therefore, the flash 23 of the plastic optical lens 4 in FIG. 5 will not adversely affect the subsequent assembling of the plastic optical lens 4, as shown in FIG. 4, and no additional processing procedure is required to remove the flash 23.

It is to be understood that the present invention is not limited by the aforementioned embodiments. Various changes and modifications having the same effect and made without departing from the spirit of the present invention should fall within the scope of the appended claims.

What is claimed is:

1. A plastic optical lens comprising: an optical effective region and a peripheral region that are concentrically formed, wherein an outer edge of the peripheral region comprises an indentation section, wherein a sprue gate is arranged opposite to the indentation section.

2. The plastic optical lens according to claim 1, wherein the indentation section is formed through a mold replication process.

3. The plastic optical lens according to claim 1, wherein the indentation section of the outer edge of the peripheral region includes an arc being concentric with the plastic optical lens.

4. The plastic optical lens according to claim 1, wherein there is an accommodation space surrounded by the indentation section of the outer edge of the peripheral region and an extending line extending from the non-indented section of the outer edge of the peripheral region.

5. The plastic optical lens according to claim 4, wherein a flash generated during the injection-molding process of the plastic optical lens is formed within the accommodation space.

6. An injection-molding method for the plastic optical lens of claim 1 employing a mold having an air duct connected to an indentation configuration of the mold.

7. The injection-molding method for the plastic optical lens according to claim 6, wherein the mold is provided with a sprue gate arranged opposite to the indentation configuration.

* * * * *